2 Sheets. Sheet 1.

J. Leffel,

Double Turbine Water Wheel.

No. 3,170. Reissued Oct. 27. 1868.

Witnesses,
Thos. L. Bugle
Chas. F. Clausen

Inventor.
James Leffel
John W. Burkwalter
Exrs of Jas Leffel dec'd
by
D. S. Mallory & Co
their attys

N. PETERS, PHOTO-LITHOGRAPHER, WASHINGTON, D. C.

2 Sheets. Sheet 2.

J. Leffel,

Double Turbine Water Wheel.

No. 3,170. Reissued Oct. 27. 1868.

Witnesses,
Thos. L. Bayles
Chas. F. Ellmann

Inventor,
James Leffel
John W. Burkholder
by James Leffel dec.
D. C. Wollaway, Atty.

UNITED STATES PATENT OFFICE

JAMES S. GOODE AND JOHN W. BOOKWALTER, OF SPRINGFIELD, OHIO, EXECUTORS OF THE ESTATE OF JAMES LEFFEL, DECEASED.

IMPROVEMENT IN CASES FOR WATER-WHEELS.

Specification forming part of Letters Patent No. 34,150, dated January 14, 1862; reissue No. 1,792, dated October 11, 1864; reissue No. 3,170, dated October 27, 1868.

DIVISION A.

*To all whom it may concern:*

Be it known that JAMES LEFFEL, of Springfield, in the county of Clarke and State of Ohio, has invented a new and useful Improvement in the Casing-Guides and Gates of Water-Wheels; and we do hereby declare that the following is a full, clear, and exact description of the same, reference being had to the annexed drawings, making part of this specification, in which—

Figure 1:
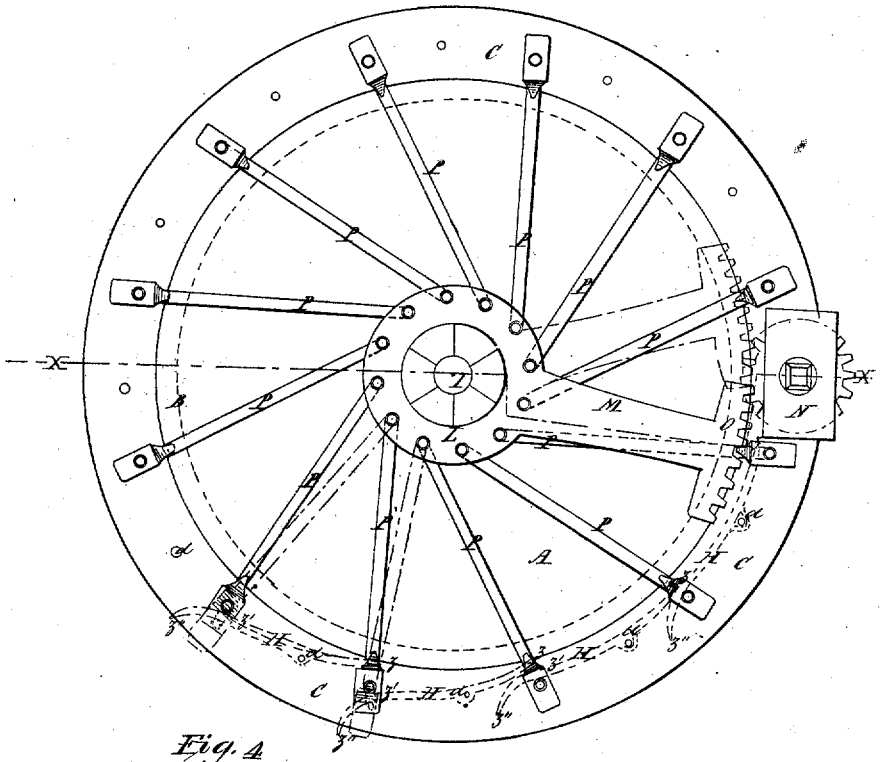
Figure 4:
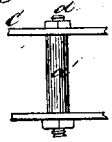
Figure 3:
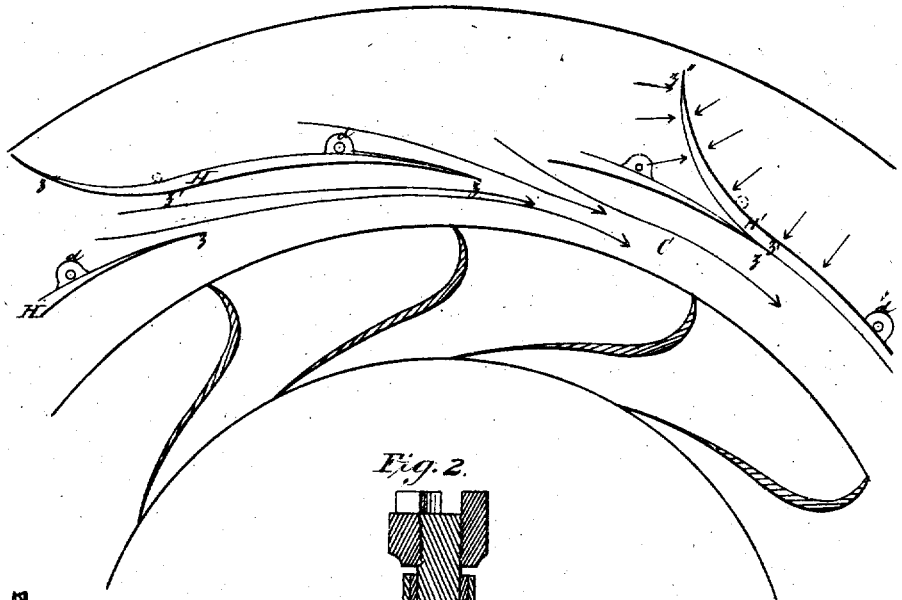
Figure 2:
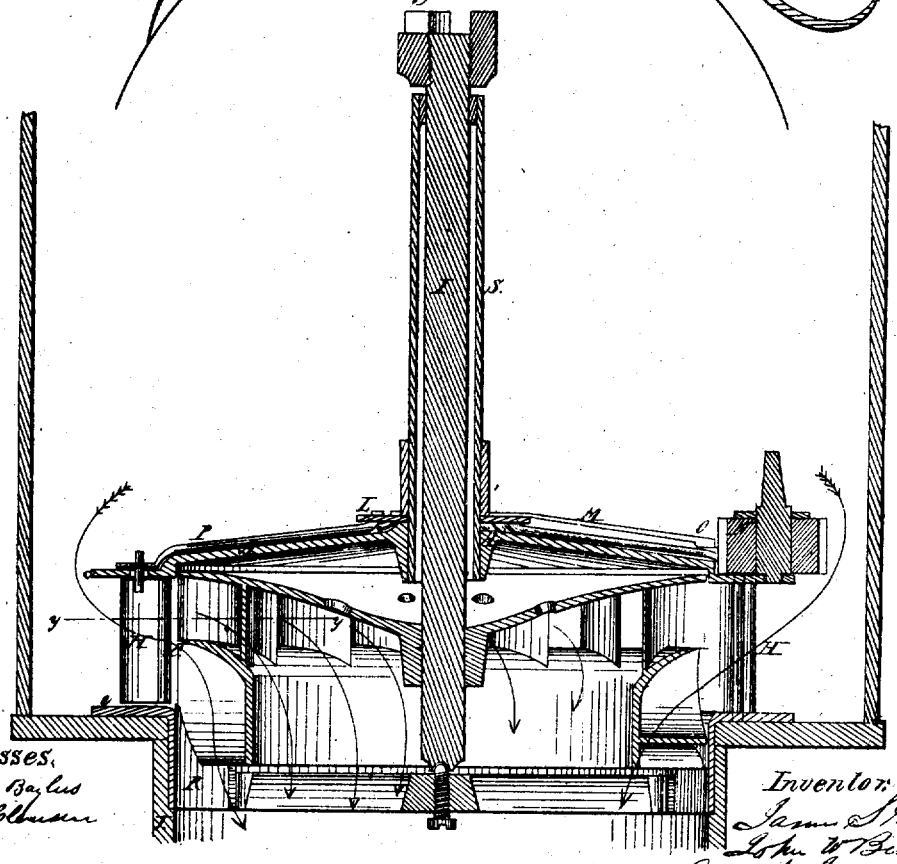

Figure 1 is a top or plan view. Fig. 2 is a vertical section taken on the line *x x*, Fig. 1; and Fig. 3 is a horizontal section of a portion of the casing and wheel, taken on the line *y y* of Fig. 2. Fig. 4 is an elevation, showing the flanges and connecting-bolt.

The same letters are employed in all the figures in the designation of the same parts.

This invention relates to a casing to be used in connection with a turbine water-wheel, which receives the water horizontally and discharges it vertically; and it consists in the combination of parts, to be hereinafter described, so that the wheel shall be inclosed in a metallic case consisting of a cylinder with a horizontal flange at the top, and an upper plate with a corresponding flange, and a series of intermediate oscillating gates operated by suitable mechanism, which serve the double function of gates to regulate the flow, and guides to control the direction of the water entering the buckets of the wheel, said parts being united by shouldered bolts, and inclosing the wheel, the shaft of which is supported by fixed bearings on the casing, both below and above the wheel, so that the wheel and casing, being manufactured and put together entire, require only to be set in an opening in the bottom of the forebay, and connected by intermediate shafting with the machinery to be driven.

In the annexed drawings, A is the top plate. It is a cast-iron circular plate, made convex, as shown in Fig. 2, as far as the periphery of the wheel, and thence extending outward in a horizontal flange, *c*. The lower part of the casing is formed by a metallic cylinder, R, which surrounds the lower portion of the wheel, and which has a horizontal flange, *e*, corresponding to, and parallel with, the flange *c*, already described. These flanges *c* and *e* are connected by a series of shouldered bolts, *d'*, passing through them—the flanges resting upon the shoulders of the bolts *d'*, so as to maintain them in position parallel with one another, and at a proper distance apart to receive the intermediately-placed oscillating gates H. These gates are metallic plates. They are shown in Fig. 3 as constructed in what is regarded as the best form for properly delivering the water upon the vanes of the buckets of the wheel. These gates, closing one against the other, as they are arranged in series around the periphery of the wheel, are made to swing on their pivots at *d*, so that they may be used either to entirely exclude the water from the wheel, or to regulate its flow in greater or less quantities upon the wheel, in a direction controlled by the form of the plates, which thus perform the double function of gates and guides.

The gates are so placed that, when open, they shall still leave an annular chamber or sluiceway, C, between their points and the periphery of the wheel, for the purpose of relieving the gates from the tremor incident to a close proximity to the wheel, and also to guard against the danger of substances entering with the water being caught between the points of the gates and the edges of the vanes of the buckets of the wheel. The width of the annular chamber must be sufficient to permit the column of water, broken by the gate-plates in passing through the gates, to reunite between the points of the gates and the wheel.

The issue of the buckets and of the gates should be so proportioned that any solid substance which may pass through the gates, will pass through the buckets of the wheel.

In using the expression "a gate which is open," or one that is "wide open," we intend to describe gates so far open that they will issue all the water that will flow through the issues of the wheel.

The wheel-shaft I rests upon a step supported upon a bridge-tree attached to the cylinder R below the wheel. It passes through a hole in the center of the top plate A, which is shown as constructed with a downwardly-projecting hub, A′, supporting a sleeve, S, which, extending above the crown-plate A, forms, at the top, a bearing above the wheel for the shaft, which is thus supported in a line perpendicular to the horizontal plane of the wheel and casing by parts connected with the latter, the parallelism of the flanges being preserved by the shouldered bolts. The wheel-shaft having its bearings on the casing, it is only necessary to cut a hole in the bottom of the forebay to receive the tube R, which may be secured to the floor by bolting its flange *e* thereto, affording thus an easy mode of adjusting the wheel and shaft, in case the forebay should settle to one side, by merely keying up one side of the flange *e*. A collar, L, is fitted upon the tube S, just above the plate A, to which the inner ends of a series of rods, P, are pivoted, said rods being attached to the gates H, near their outer ends, by means of bolts screwed into lugs on the gates at their outer edges, the flange *c* being cut away, as required, to permit the oscillation of the gates. The collar L has an arm or lever, M, attached rigidly to it, the outer end of which is provided with a rack-bar, O, properly curved to engage the teeth of the pinion N, by which it is operated. This pinion is attached to the plate A, and its shaft may be extended to any point most convenient for operating the gates.

Although this casing is especially designed for said LEFFEL'S improved wheel, (shown in the drawings, and fully described in another subdivision of the original patent, filed herewith,) it may be readily adapted to other wheels of analogous form. The wheel and casing, in all cases, must be submerged in the bottom of the forebay, and the cylinder R may be connected with the water in the tail-race by a connecting air-tight pipe J, whenever it is desirable to set the wheel above the level of the tail-race.

What we claim as the invention of the said JAMES LEFFEL, and desire to secure by Letters Patent, is—

1. A case for a water-wheel, composed substantially of a crown-plate, A, with a horizontal flange, *c*, projecting beyond the periphery of the wheel, a cylinder, R, with a correspondingly-projecting flange, *e*, and a series of oscillating gates placed intermediately between the flanges, substantially as described.

2. In combination with a case, substantially such as described, an upper and lower support for the water-wheel shaft, attached to the case, substantially as described.

3. The upper plate A, when constructed with the flange *c* cut away to admit of the movement or oscillation of the gate-plates, substantially as described.

4. The bolts that hold the crown-plate and cylinder by their flanges in proper position, in combination with the case and the means for sustaining the wheel, substantially as described.

In testimony whereof we have signed our names to this specification before two subscribing witnesses.

JAMES S. GOODE.
JOHN W. BOOKWALTER.

Witnesses:
R. MASON,
T. C. CONNOLLY.